United States Patent
Brock et al.

(10) Patent No.: US 7,533,815 B2
(45) Date of Patent: May 19, 2009

(54) CAMERA FRAME SELECTION BASED ON BARCODE CHARACTERISTICS

(75) Inventors: Christopher Brock, Manorville, NY (US); Brad Carlson, Huntington, NY (US); Thomas Lackemann, Syaville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 386 days.

(21) Appl. No.: 11/443,832

(22) Filed: May 31, 2006

(65) Prior Publication Data

US 2007/0278306 A1    Dec. 6, 2007

(51) Int. Cl.
*G06K 7/10* (2006.01)
(52) U.S. Cl. .................. 235/454; 235/462.09
(58) Field of Classification Search ............ 235/462.09, 235/462.1, 462.11, 462.12, 454
See application file for complete search history.

(56) References Cited

U.S. PATENT DOCUMENTS

| 6,405,925 B2 | 6/2002 | He et al. |
| 2007/0090191 A1* | 4/2007 | Schnee et al. .......... 235/462.41 |

\* cited by examiner

*Primary Examiner*—Karl D. Frech
(74) *Attorney, Agent, or Firm*—Tarolli, Sundheim, Covell & Tummino LLP

(57) ABSTRACT

An imaging scanner with a two dimensional array of sensors analyzes data from a segment of the array to detect if one or more indicia conditions is present that would prevent a successful decode based on data in the segment. In this manner, if decoding the indicia using data from the segment of array data is not possible, an enlarged frame of array data can be sought for decode when necessary while one-dimensional and simple two-dimensional barcodes can be quickly processed by loading and decoding only the segment of the array.

31 Claims, 3 Drawing Sheets

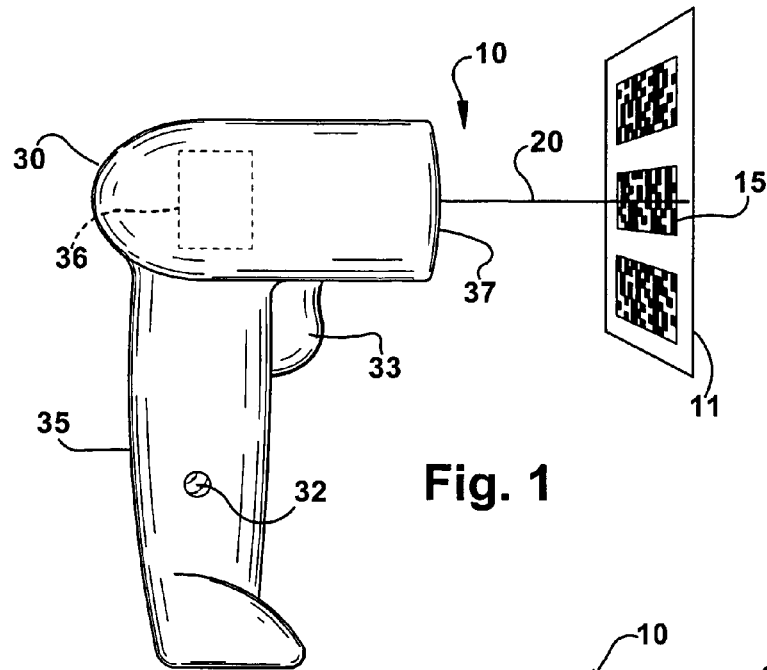
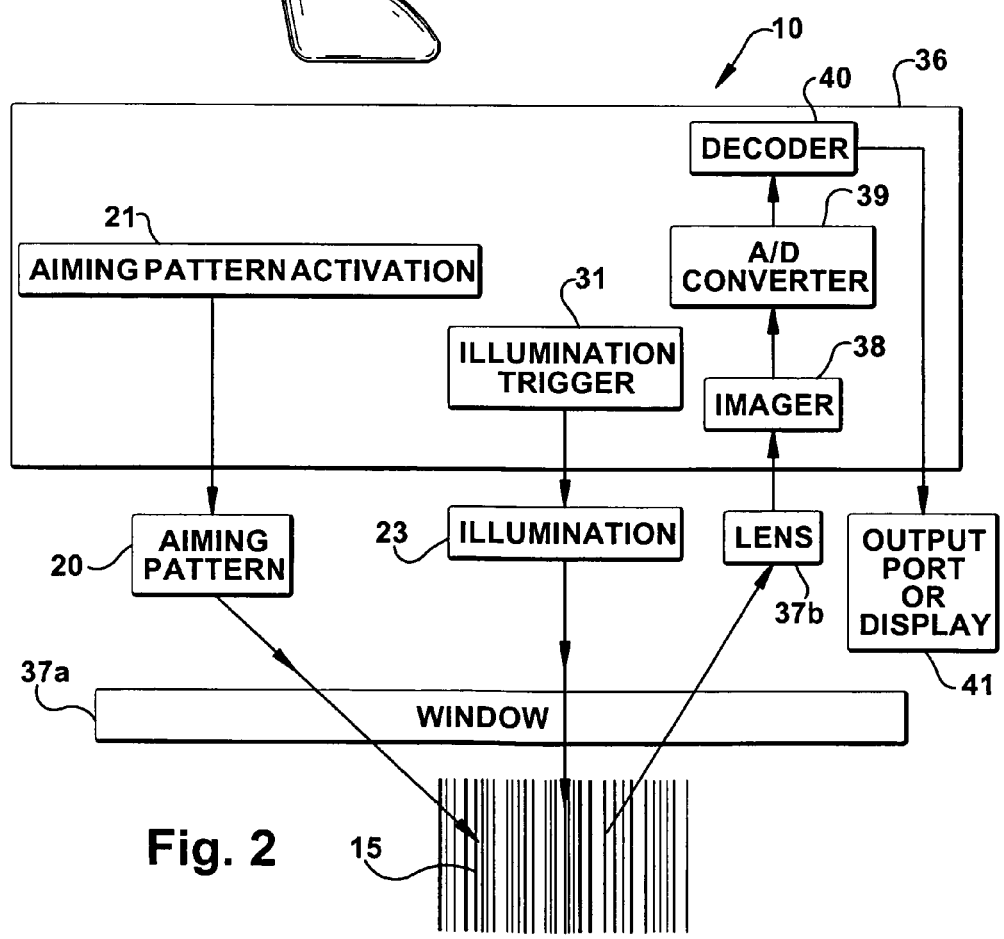

CAMERA FRAME SELECTION BASED ON BARCODE CHARACTERISTICS

TECHNICAL FIELD

The present invention relates generally to the field of scanners and more particularly to the field of imaging scanners.

BACKGROUND

Imaging scanners, or "imagers," are increasingly replacing the laser scanner for many uses. This is because the imagers offer more features than laser scanners such as the ability to read two-dimensional barcodes and capturing images such as checks and identification documents. However, when processing one-dimensional barcodes, a laser scanner can often outperform an imager, especially a high-resolution imager. This is because of the additional time required for the imager to capture and process an entire image. For example, it is necessary for an imager to search the image to determine if a barcode is present anywhere in the image and if so, identify the type of barcode. This search for the presence of a barcode in the image stored in pixel data is generally done by analyzing sub-regions of the image and calculating statistics such as a level of contrast between pixels in the sub-region and directional vectors associated with detected edge lines. Based on the statistics one or more sub-regions are identified as potentially containing a barcode and each of these sub-regions is passed on for decoding. One example of a barcode detecting system can be found in U.S. Pat. No. 6,405,925 to He et al, assigned to the assignee of the present invention, and incorporated herein by reference in its entirety.

To improve the operation speed of imagers some decoding systems operate on data from a segment of the image frame. For example, U.S. patent application Ser. Nos. 11/341,950 and 11/395,569, assigned to Symbol Technologies, Inc. and incorporated herein by reference describe imagers that search for a simple one dimensional barcode in a pre-selected cropped portion of the image frame and resort to full frame processing in the event that no such barcode is found in the cropped frame after one or more decode attempts.

SUMMARY

An imager with a two dimensional array of sensors processes a subset of the sensors in the array to determine whether a variety of image conditions are met that would require data from an enlarged subset or frame of data, such as a full frame of data, for subsequent processing. If any of the conditions is met, the imager acquires a the enlarged subset for subsequent processing.

Accordingly, a decoder and an imager that incorporates the decoder are provided that process indicia having an indicia area. The imager includes a two-dimensional array of sensors capable of collecting data corresponding to an image of approximately the entire indicia area when the imager is acting within the operating range of the indicia. The two-dimensional array of sensors is capable of outputting data from a pre-selected segment of the sensors in an output period that is shorter in duration than an output period that would be required to output data from the entire array of sensors. An array controller selects between a first array output mode in which data from the segment of sensors is output and a second array output mode in which data from a larger portion of the array or the entire array of sensors is output. The decoder includes a pixel analyzer that receives data from the segment of sensors and determines if one or more decode preventing conditions is present in the image. The decoder also includes a frame selector that outputs a signal, such as for example a number of array rows to be skipped during output, to the array controller to place the array in the first or second array output mode. In this manner, data from the enlarged portion of the array of sensors is output to the decoder on a subsequent collection of data if the one or more decode preventing conditions is present.

It may be advantageous to define the segment as a set of adjacent rows of sensors located near a center of the array. To detect the one or more decode preventing conditions, the pixel analyzer may determine a degree of skew between a horizontal axis of the indicia as represented in the image and a horizontal axis of the array. When the determined skew is above a threshold amount, the frame selector outputs a signal to the array controller to place the array in the second array output mode. To detect the one or more decode preventing conditions, the pixel analyzer may classify the indicia with a probable barcode type. When the probable barcode type is a two dimensional barcode in which edge indicators are not detected, the frame selector outputs a signals to the array controller to place the array in the second array output mode.

An indicia decoding method as well as an apparatus and computer readable media having instructions stored thereon for performing the method are provided. The method decodes an indicia that is present on a target surface with an imager that includes a two dimensional array of light sensors. A subset of light sensors is selected from the two dimensional array to be used to decode the indicia. Data indicative of an image reflected back from the indicia is collected in the subset of light sensors. The subset of light data is analyzed to determine if one or more decode preventing conditions is present in the image. If the one or more decode preventing conditions is present an enlarged portion of the array data such as, for example, data from the entire array is selected for subsequent collection of image data and light data from the enlarged portion of the array is output for subsequent decoding.

Data from the subset of light sensors may be initially output to a decoder to decode the indicia if the light data is sufficient for decoding. The subset of light data may be collected by setting the array to skip a first number of rows of sensors prior to outputting the data to the decoder. The subset of light data may be analyzed to determine a degree of skew between the indicia as represented in the image and the array of light sensors. If the degree of skew is above a threshold amount the enlarged portion of the array may be selected for subsequent decoding. The subset of light data may be analyzed to determine a probable indicia type. If the probable indicia type is determined to be a two dimensional barcode that is not entirely contained in the image, data from the enlarged portion of the array may be selected for subsequent decoding.

These and other objects, advantages, and features of the exemplary embodiment of the invention are described in detail in conjunction with the accompanying drawings.

BRIEF DESCRIPTION OF DRAWINGS

FIG. 1 is a side view of a handheld imaging scanner acting upon a two-dimensional barcode;

FIG. 2 is a functional block diagram of an imaging scanner constructed in accordance with an embodiment of the present invention;

DETAILED DESCRIPTION

Figure 3:
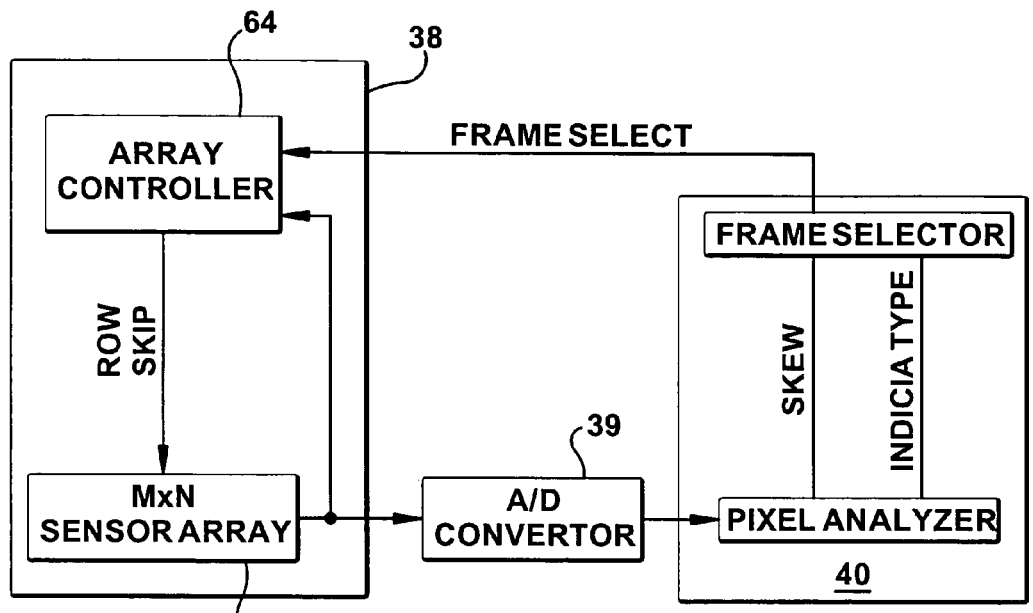
FIG. 3 is a schematic view of imaging scanner components that perform cropped frame analysis according to an embodiment of the present invention.

FIG. 1 shows a handheld imaging scanner 10 acting upon a surface 11 having a plurality of two-dimensional barcodes 15. For the purposed of this description, a handheld imaging scanner will be discussed. However, it will be apparent to one of ordinary skill in the art that the techniques and devices described herein can be practiced advantageously with stationary or bi-optic imaging scanners. The handheld imaging scanner 10 includes a housing 30 having a handle portion 35 adapted to be gripped by a user. A scan engine 36 that includes scanner components that perform functions such as imaging, control, and optionally, decoding is mounted within the head of the scanner. A user actuated mode switch 32 is also located on the handle portion.

The imaging scanner emits a focused aiming line 20 that is aimed by the user at the particular barcode 15 that is presently being read. The aiming pattern can be activated by a trigger 33, followed by full-scale illumination of the target area. Alternatively, the aiming pattern can be active at all times in which case the trigger 33 activates full-scale illumination of the target. In addition, the aiming pattern can be activated upon the detection of motion in a sequence of images. The light emitted from the imaging scanner exits the scanner through a window 37 and light reflected back from the target surface passes through the window to imaging components within the scanner.

FIG. 2 is a functional block diagram of an imaging scanner that initially processes a subset of the image data to attempt to decode a barcode that may be located in the center of the image or to adjust various imager parameters prior to a subsequent scan to increase the likelihood of a successful decode. The scan engine 36 includes an imager 38 having a two-dimensional array of sensors such as CCD or CMOS sensors that sense light reflected back from the target surface and form pixel data corresponding to an image of the target. An additional feature of the sensor array is the capability to output a portion of pixels upon request, such as by skipping a certain number of rows during output, so that the transfer time and processing time can be shortened by acting on a subset of pixel data rather than the whole array of pixel data. One such sensor is a CMOS array made by Micron having part number MT9M001. The pixel data from the array is converted into digital data by an A/D converter 39 that is decoded by decoder 40.

Many imaging scanners employ barcode detection techniques that process full frame pixel information prior to decoding to determine whether a barcode is present within the image stored in the pixels. As discussed above U.S. Pat. No. 6,405,925, which describes a number of techniques that can be used to detect one-dimensional, two-dimensional, and MaxiCode type barcodes. During decoding, statistical information about pixels or groups of pixels is compiled, such as local levels of contrast and the presence of relatively sharp image edges. In the case of one or two dimensional barcodes, an angle of skew between a horizontal axis of the optical components of the scanner with respect to the barcode elements is also determined to aid in the decoding process.

An output port or display 41 provides the results of decoding to a peripheral device (not shown) or displays them to the user. The scanner 10 also includes an illumination source 23 that is capable, within a prescribed scanner range, of illuminating a portion of the target surface sufficient to fill the entire two-dimensional array of sensors with data.

FIG. 3 is a schematic illustration of the sensor array 62 and its controller 64 that sets various operating parameters on the array, such as frame size. The decoder 40 includes a pixel analyzer that analyzes the pixel data to determine if one or more decode preventing conditions are met and a frame selector that signals the array controller as to whether to place the array in cropped frame mode or in an enlarged or full frame mode in which a larger subset, up to and including the full frame's worth, of pixel data from the array is passed to the decoder. In the case of the MT9M001 sensor array, the frame selector sends a row skip value to the array controller to cause the array to skip that number of rows prior to outputting sensor data.

As discussed in the background, some imagers attempt to decode data from a subset of sensors in the array. Often, several attempts are made to decode data without resorting to analyzing data from the entire array. The transfer time and processing time for examining the data from the subset of sensors becomes burdensome when many attempts are made prior to moving on the full frame processing, especially when conditions are such that a successful decode is not possible. Accordingly, the decoding technique described herein tests for two conditions that indicate that decoding is not possible using the present amount of cropped frame data, namely the presence of a one dimensional or a two dimensional barcode that is not wholly present within the cropped frame.

Figure 5:
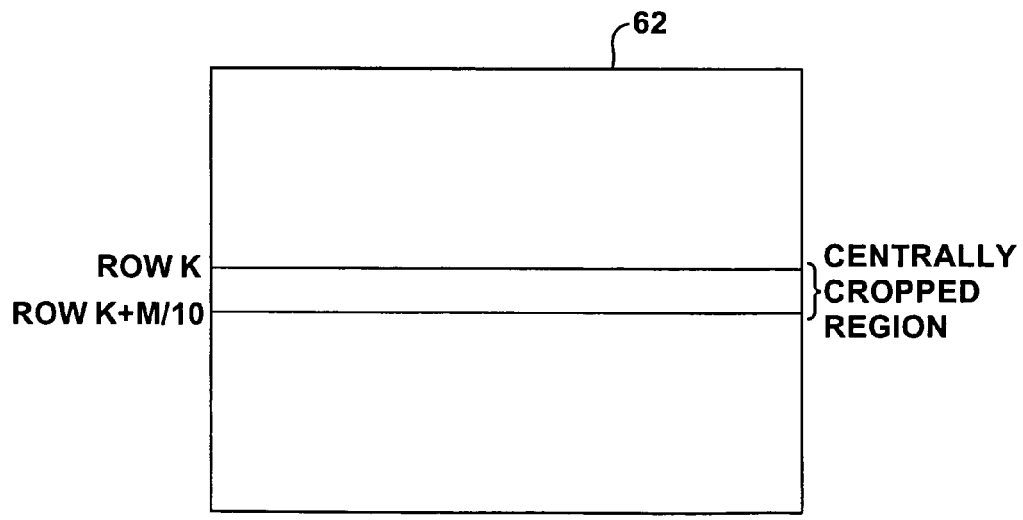
FIG. 5 is a schematic illustration of a sensor array of an imaging scanner constructed in accordance with an embodiment of the present invention.
Figure 4:
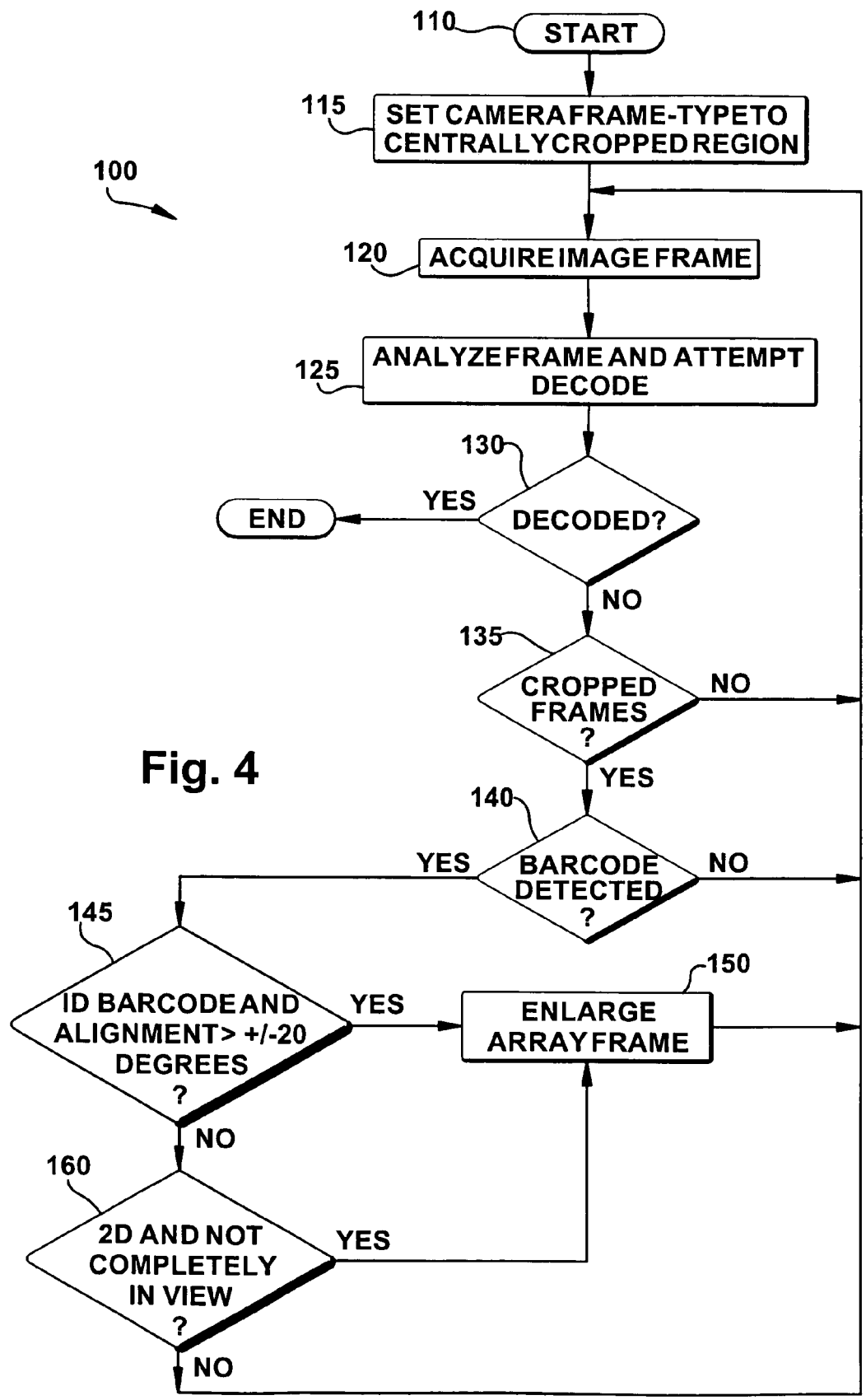
FIG. 4 is a flowchart illustrating a method of operating an imaging scanner according to an embodiment of the present invention.

FIG. 4 outlines an image processing routine 100 that includes the analysis of a cropped frame portion of pixel data for both an initial decode attempt and to detect image conditions that make decoding with the cropped frame data impossible. At 110 the routine starts and at 115 the array controller selects the centrally cropped region defined by the center ten percent of rows of the sensor array as shown in FIG. 5. This can be done by setting a row skip function on the array to the desired number of skipped rows such as, in described embodiment, 45% of the total rows and then outputting the next 10% of the rows. At 120 the pixel data from the selected rows is acquired. At 125 and 130, the data from the selected rows is sent to the decoder which attempts to decode the data. If the target indicia is a 1-D barcode and the user has oriented the frame so that it is normal to the horizontal axis of the barcode and the barcode is centered in the frame, it is possible that this decode will be successful, and if so the processing routine ends.

At 135, the quantity of pixel data is checked to determine if it corresponds to a cropped frame and not a preselected enlarged frame of data such as a full frame. If the data is from a cropped frame, the typical barcode detection techniques such as those described above are performed on the cropped frame of pixel data at 140. If no barcode is detected, another cropped frame is acquired at 120. If a barcode is detected, the skew angle between the barcode elements and the imaging components, which was calculated as part of the barcode detection processing, is compared to a threshold (in this case 20 degrees) at 145. If the skew is excessive, at 150 the array is set to output the enlarged frame of data, such as a full frame, of pixel data and the method loops back to attempt to decode with the enlarged frame. If the skew is not excessive, at 160 the cropped frame is checked to see if a two-dimensional barcode is present but is clipped by the frame, for example because edge lines are not detected, and if so the array is set to obtain the enlarged frame of pixel data prior to the next decode attempt.

In this way, an imaging scanner can quickly determine, on the first pass of analysis using the cropped frame of data, that the cropped data is insufficient for decoding purposes. The imaging scanner can immediately switch to processing of the enlarged frame to save operating time that would be spent on subsequent processing of cropped frame data.

It can be seen from the foregoing description that an imaging scanner that can process a subset of sensors in the array to determine whether a variety of image conditions are met that would require full or enlarged frame processing. If any of the conditions is met, the imager acquires a full frame for subsequent processing to increase operating speed. Although the invention has been described with a certain degree of particularity, it should be understood that various changes can be made by those skilled in the art without departing from the spirit or scope of the invention as hereinafter claimed.

We claim:

1. An imager that processes indicia comprising:
   a two-dimensional array of sensors capable of collecting data corresponding to an image of the indicia when the imager is acting within the operating range of the indicia and wherein the two-dimensional array of sensors is capable of outputting data from a pre-selected first segment of the sensors in an output period that is shorter in duration than an output period that would be required to output data from a second segment corresponding to a second, larger, segment of data from the array of sensors, a number of sensors in the first segment of sensors being less than a number of sensors in the second segment of sensors;
   an array controller that is selectable between a first array output mode in which data from the first segment of sensors is output and a second array output mode in which data from the second segment of sensors is output;
   a decoder that includes a pixel analyzer that receives and analyzes data from the first segment of sensors to determine if one or more decode preventing conditions is present in the image and a frame selector that signals the array controller to select between the first and second array output modes; and
   wherein if the one or more decode preventing conditions is detected by the pixel analyzer, the frame selector signals the array controller to place the array in the second array output mode such that data from the second segment is output to the decoder in subsequent processing.

2. The imager of claim 1 wherein the second segment corresponds to substantially all of the sensors in the array.

3. The imager of claim 1 wherein the segment is a set of rows of sensors located near a center of the array.

4. The imager of claim 3 wherein the rows are adjacent to one another.

5. The imager of claim 1 wherein the pixel analyzer determines a degree of skew between a horizontal axis of the indicia as represented in the image and a horizontal axis of the array and wherein when the determined skew is above a threshold amount, the frame selector signals the array controller to place the array in the second array output mode.

6. The imager of claim 5 wherein the pixel analyzer determines the skew by analyzing statistics about local levels of contrast in the image.

7. The imager of claim 1 wherein the pixel analyzer classifies the indicia with a probable barcode type and wherein when the probable barcode type is a two dimensional barcode in which edge indicators are not detected, the frame selector signals the array controller to place the array in the second array output mode.

8. A method that decodes an indicia that is present on a target surface with an imager that includes a two dimensional array of light sensors, the method comprising:
   selecting a first subset of light sensors from the two dimensional array to be used to decode the indicia;
   collecting data indicative of an image reflected back from the indicia in the first subset of light sensors;
   analyzing the subset of light data to determine if one or more decode preventing conditions is present in the image; and
   if the one or more decode preventing conditions is present, selecting a second subset of light sensors corresponding to an enlarged portion of the array for collection of image data and outputting light data from the second subset for subsequent decoding, a number of sensors in the first subset of light sensors being less than a number of sensors in the second subset of light sensors.

9. The method of claim 8 wherein the second subset of light sensors of the array corresponds to substantially the entire array.

10. The method of claim 8 comprising outputting the first subset of light data to a decoder to decode the indicia if the light data is sufficient for decoding.

11. The method of claim 8 wherein the first subset of light data is collected by setting the array to skip a first number of rows of sensors prior to outputting the data to the decoder.

12. The method of claim 8 wherein the first subset of light data is analyzed by determining a degree of skew between the indicia as represented in the image and the array of light sensors and if the degree of skew is above a threshold amount, the second subset is selected for subsequent decoding.

13. The method of claim 8 wherein the subset of light data is analyzed by determining a probable indicia type and if the probable indicia type is determined to be a two dimensional barcode that is not entirely contained in the image, the second subset is selected for subsequent decoding.

14. Computer readable media having computer executable instructions stored thereon for performing steps for decoding an indicia that is present on a target surface with an imager that includes a two dimensional array of light sensors, the steps comprising:
   selecting a first subset of light sensors from the two dimensional array to be used to decode the indicia;
   collecting data indicative of an image reflected back from the indicia in the first subset of light sensors;
   analyzing the first subset of light data to determine if one or more decode preventing conditions is present in the image; and
   if the one or more decode preventing conditions is present, selecting a second subset of light sensors corresponding to an enlarged portion of the array for collection of image data and outputting light data from the second subset for subsequent decoding, a number of sensors in the first subset of light sensors being less than a number of sensors in the second subset of light sensors.

15. The computer readable media of claim 14 wherein the second subset of the array corresponds to substantially the entire array.

16. The computer readable media of claim 14 wherein the instructions include the step of outputting the first subset of light data to a decoder to decode the indicia if the light data is sufficient for decoding.

17. The computer readable media of claim 14 wherein the instructions for collecting data in the first subset includes the step of setting the array to skip a first number of rows of sensors prior to outputting the data to the decoder.

18. The computer readable media of claim 14 wherein the instructions include the steps of analyzing the first subset of light data to determine a degree of skew between the indicia as represented in the image and the array of light sensors and selecting the second subset for subsequent decoding if the degree of skew is above a threshold amount.

19. The computer readable media of claim 14 wherein the instructions include the steps of analyzing the first subset of light data to determine a probable indicia type and selecting the second subset for subsequent decoding if the probable indicia type is determined to be a two dimensional barcode that is not entirely contained in the image.

20. An apparatus that decodes an indicia that is present on a target surface with an imager that includes a two dimensional array of light sensors, the apparatus comprising:
    means for selecting a first subset of light sensors from the two dimensional array to be used to decode the indicia;
    means for collecting data indicative of an image reflected back from the indicia in the first subset of light sensors;
    means for analyzing the first subset of light data to determine if one or more decode preventing conditions is present in the image; and
    means for selecting a second subset of light data corresponding to data from an enlarged portion of the array for collection of image data and outputting light data from the second subset for subsequent decoding if the one or more decode preventing conditions is present, a number of sensors in the first segment of light sensors being less than a number of sensors in the second segment of light sensors.

21. The apparatus of claim 20 comprising means for outputting the first subset of light data to a decoder to decode the indicia if the light data is sufficient for decoding.

22. The apparatus of claim 20 wherein the means for outputting the first subset of light data includes means for setting the array to skip a first number of rows of sensors prior to outputting the data to the decoder.

23. The apparatus of claim 20 wherein the means for analyzing the first subset of light data includes means for determining a degree of skew between the indicia as represented in the image and the array of light sensors.

24. The apparatus of claim 20 wherein the means for analyzing the first subset of light data includes means for determining a probable indicia type that is not entirely contained in the image.

25. A decoder that processes indicia with an imager that includes a two-dimensional array of sensors capable of collecting data corresponding to an image of the indicia when the imager is acting within the operating range of the indicia and wherein the two-dimensional array of sensors is capable of outputting data from a pre-selected first segment of the sensors in an output period that is shorter in duration than an output period that would be required to output data from the entire array of sensors and an array controller that is selectable between a first array output mode in which data from the segment of sensors is output and a second array output mode in which data from a second, enlarged, pre-selected segment of sensors of the array of sensors is output, the decoder comprising:
    a data analyzer that receives data from the first segment of sensors and determines if one or more decode preventing conditions is present in the image; and
    a frame selector that outputs a signal to the array controller to place the array in either the first or second array output mode;
    wherein the frame selector outputs a signal to the array controller to place the array in the second array output mode on a subsequent collection of data if the one or more decode preventing conditions is present, a number of sensors in the first segment of sensors utilized in the first array output mode being less than a number of sensors in the second segment of sensors.

26. The decoder of claim 25 wherein the second segment corresponds to substantially the entire array.

27. The decoder of claim 25 wherein the segment is a set of rows of sensors located near a center of the array.

28. The decoder of claim 27 wherein the rows are adjacent to one another.

29. The decoder of claim 25 wherein the pixel analyzer determines a degree of skew between a horizontal axis of the indicia as represented in the image and a horizontal axis of the array and wherein when the determined skew is above a threshold amount, the frame selector outputs a signal to the array controller to place the array in the second array output mode.

30. The decoder of claim 25 wherein the pixel analyzer classifies the indicia with a probable barcode type and wherein when the probable barcode type is a two dimensional barcode in which edge indicators are not detected, the frame selector outputs a signal to the array controller to place the array in the second array output mode.

31. The decoder of claim 25 wherein the frame selector outputs a number of rows of sensors to be skipped during a subsequent output of sensor data.

* * * * *